United States Patent Office 2,760,541
Patented Aug. 28, 1956

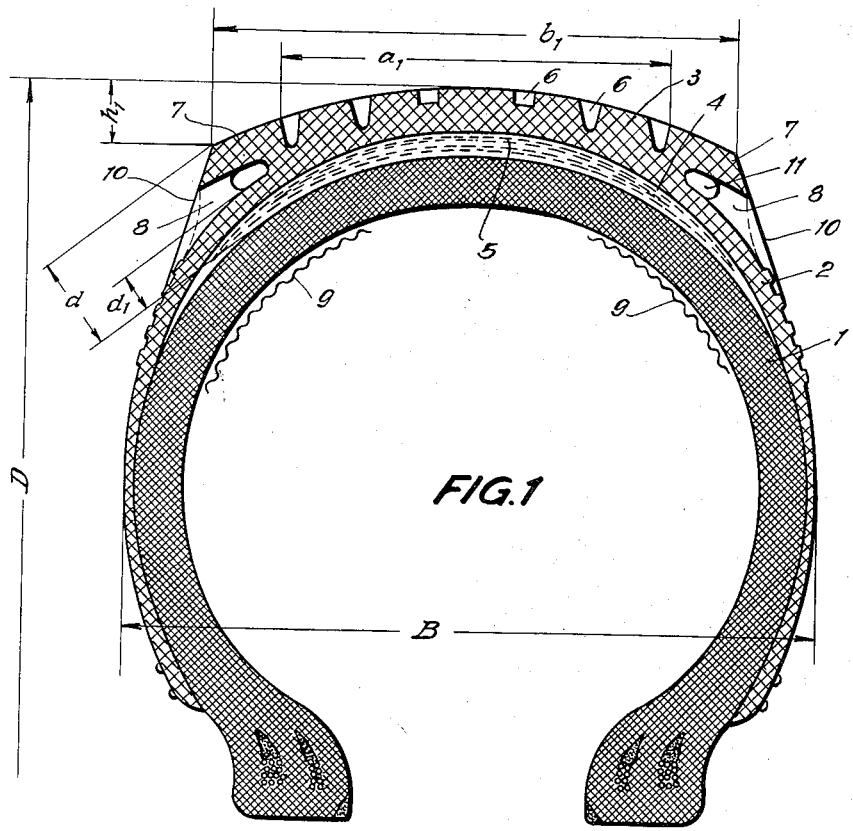
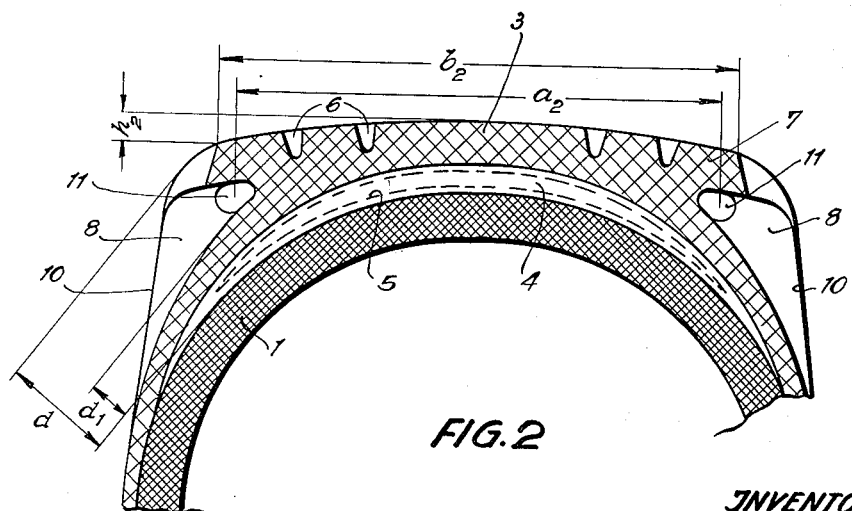

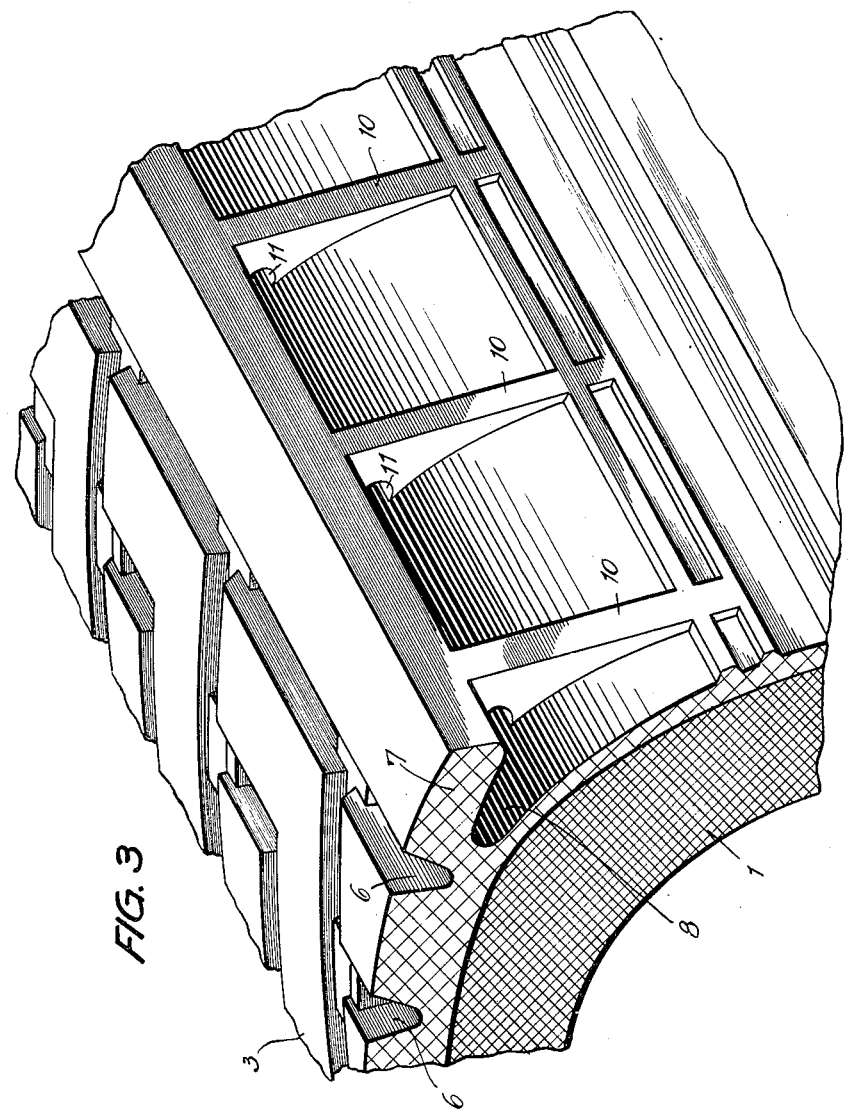

2,760,541

PNEUMATIC TIRES FOR VEHICLES

Hubert Reifenberger, Bad Homburg vor der Hohe, Germany, assignor to Peters Pneu Renova K.-G., Bad Homburg vor der Hohe, Germany Application December 3, 1951, Serial No. 259,523

Claims priority, application Germany December 7, 1950

3 Claims. (Cl. 152—153)

This invention relates to an embodiment of a vehicle tire in regard to the design of the rubber casing, particularly for the tread, wherein is realized an aim to keep as low as possible the temperature especially harmful for the qualities of the materials entering into the manufacture thereof. For the shape of the tread in vehicle tires the most diverse forms of execution are known. In this regard one can recognize the effort to comply with the requirements of protection against skidding, wear and tear, conduction of heat and careful treatment of the tire frame proper or of the so-called carcass which is known to consist of a plurality of rubberized cord fabric layers and which is surrounded exteriorly by a rubber layer.

It is known that the working stress is to be considered as the cause of heating the tire and leads to periodically quickly changing jolts and stretchings within the tire. These concentrate substantially in the working stress zone, particularly below the tire shoulder with its high accumulation of material. The harmful effect of the combined influences of high temperature and mechanical alternate stress manifests itself in the weakening of the tire tissue of rubber and cord. Very frequently this leads to destruction in the rubber or fabric or in the boundary layer of both materials whence they also may originate.

It has been demonstrated that the conventional execution forms of the rubber ply in spite of the arrangement of extensively divided designs and high design cleats of the anti-skidding pattern in the reinforced ply of the tread especially in the lateral shoulders, still show too great material accumulations also in closed form about the entire circumference of the tire.

The block formation here occurring on one hand is noticeable for the lack of resiliency in the immediate exertion of pressure on the cord fabric and the increased danger connected therewith of the working stress, while on the other hand in these rigid and strong sections especially high heat accumulations and excessive heating are to be noted.

Thus it is comprehensible that the cord fabric or the carcass respectively shows the highest wear and as a result often indentations just at those points which adjoin the highest accumulations of material and at that the tire shoulders with the result that the deformation of the tire promotes thermal and mechanical alternate stresses reaching a degree leading to the mentioned critical decrease in value of the tire elements and finally to their destruction.

The division of the lateral shoulder by the known arrangement of radial cuts is in the light of experience not sufficient to attain the necessary ventilation for diminishing the accumulation of heat. Moreover, a diminution of the non-yielding and non-resilient pressure effect on the fabric with the remaining strong cleats is not attained. The entire tread construction does not permit the arrangement of deeper radial cuts in the lateral shoulders at short distances because otherwise in the absence of a closed lateral circumferential surface the occurrence of annular stresses would lead to tread destruction, for example, by fissure formations. In the tread formation of vehicle tires the trend was to make the curvature of the tread approximately parallel to the curvature of the tire frame in order to prevent to some extent the lateral accumulation of material. Disregarding the fact that this leads only in a certain degree to a diminution of the shoulder dimension, the specific ground pressure in the middle of the tread surface is thereby considerably increased and protection against skidding enhanced.

The invention starts from the recognition of the fact that the excessive heat development noticeable in the tire shoulder with particularly high accumulations of material as a consequence of the high work stress during continuous operation, furthermore the high specific surface pressures originating in the non-yielding character of the thick material cleats as a cause for the inadmissibly high wear on the tire frame at these points, and finally the higher specific ground pressure conditioned upon the tread curvature. All of these factors are responsible for the insufficient tire efficiency and premature wear of the pneumatic tire. For the removal of the listed disadvantages according to the invention a change in the structure of the rubber ply adjacent the tread surface is provided thereby attaining on one hand the necessary division of the material accumulations in the tire shoulders necessary for the avoidance of excessive heat accumulation and on the other hand the enlargement of the tread surface and thereby the increase in the safeguard against skidding, as well as diminution of the specific ground pressure and of the wear on the tread band. To this end the tread surface portion adjoining the tire shoulders is formed on both sides free floating due to an extensive air channel, or groove, as an indentation at the tire periphery which extends in and beneath the tire shoulders. These shoulders are therefore yielding in contrast to the rigid blocks and lugs of the usual tire embodiments. A direct non-shock absorbing pressure exerted on the cord fabric is absent and thus also the excessive working stress leading to increased heating of the tire and the mechanical destruction of the fabric. Fundamentally the tire shoulder laterally projecting and free floating shoulders especially in small pneumatic tires is formed as extending throughout the circumference of the tire. However, for mechanically rigidifying the shoulders in large tires at certain distances along the tire periphery bracing ribs may be provided, the strength dimension of which is of such value that yielding or deflection respectively under the pressure load is made possible.

The free floating formation of the tire shoulder causes the complete air flow; thus the continuous particularly advantageous low heat conduction. Very harmful heating during continuous operation and at high speeds is thereby avoided, and the physical properties of the basic tire elements remain unimpaired whereby a longer life is assured.

For the complete ventilation of the tread surface especially of the tire bead the insight is decisive that the air currents developing at high speeds manifest themselves at the tire periphery as strong air jets. The concentrated air jets exercise an increased cooling effect because it can without hindrance flow or whirl through the groove of the tire shoulder. If, for example, in larger tires bracing ribs for the free floating tire shoulder are provided, these are advantageously equipped at the deepest points of the grooves with gaps. In the narrowed gap the speed of the air current increases and thus the heat conduction reduced.

The free floating formation of the tire shoulder permits a deviation from the high curvature of the tread surface. This curvature in designing the cross section of the tire according to the invention can be substantially flattened. Thereby the anti-skidding effect is quite considerably increased. The ground pressure is substantially lowered and a delay in the mechanical rubbing-off of the tread rubber occurs. If now on one hand the wear is reduced to a lowest degree by avoiding heating the tire and by the preservation of the physical properties of the basic elements, on the other hand this advantage is still promoted by the improved mechanical effect, thus diminution of ground pressure and entire absence of the harmful influence of the working stress adjacent the tire shoulder. In addition to that by the free floating design of the tire shoulder a wellnigh uniform embodiment of the tread surface ply in the rubber layer is made possible and with that a uniform wear of the tread rubber band in its full width takes place.

The invention is described with reference to the accompanying drawing, in which:

Fig. 1 is a cross sectional view of one embodiment according to the invention;

Fig. 2 shows an upper part cross section of another tire embodiment; and

Fig. 3 illustrates in perspective a partial view of the tire of Fig. 1 from above and from the side, and also partly in cross section.

The inner carcass or cord fabric structure is covered by the rubber outer layer 2. Between the cord fabric 1 and the tread surface 3 of the rubber layer 2 is arranged a reinforcement 4 provided with a cord layer 5. The tread surface 3 of the rubber layer 2 has cleats 6 for protection against skidding.

The laterally extending tire shoulders of the rubber tread 3 are designed as a closed ring and are kept free floating by an air chamber indentation or groove 8 extending throughout both sides of the entire tire periphery. The cross sectional views according to Figs. 1 and 2 illustrate that the solid block of the tire shoulder is entirely divided-up by the circumferential groove 8 so that a nearly uniform covering of the lateral faces of the rubber layer 2 results. The resiliency of the free floating shoulder 7 can be easily seen so that now the partial spots of cord fabric 1 indicated by wavy line 9 and with the solid shoulders highly endangered, are no longer subjected to a non-shock absorbing pressure wear by the working stress of shoulders 7.

The material accumulation on the tire shoulders 7 is indicated by the layer thickness $d$ and in comparison the small material thickness of the tire design according to the invention denoted by $d_1$. The free floating shoulders 7 if necessary, for example, with larger tires, may be held by bracing ribs 10 arranged in a certain spaced relation on the tire periphery. The dimension of bracing ribs 10 is so chosen that they are yielding and follow the motions of the shoulders 7. By themselves the faces of ribs 10 are best suited for the additional heat conduction. For complete ventilation of groove 8 utilizing the sharp air jets on the tire periphery at high speed, gaps 11 may be provided in bracing ribs 10. Instead of the illustrated high bracing ribs 10, also lower or shorter bracing ribs may be provided. If necessary the arrangement of different bracing ribs in alternate sequence is possible.

The execution form according to Fig. 1 shows a pneumatic tire with normally curved tread surface 3 in which the arc height $h_1$ stands in a certain ratio to the tread surface width. Corresponding to arc height $h_1$ the width $a_1$ of the ground press ellipse may be ascertained.

In contrast thereto the embodiment according to Fig. 2 illustrates a flat design of tread surface 3 made possible by the free floating design of tire shouder 7, which tread is substantially widened with resulting favorable anti-skidding effect and specific ground pressure. Corresponding to tread surface width $b_2$ and low arc height $h_2$ the wider width $a_2$ of the ground pressure width is drawn.

It is believed in view of the foregoing that a further detailed description of the operation of the invention is unnecessary. Likewise it is believed that the advantages of the invention will be readily apparent.

Having thus fully described the invention what is claimed as new and desired to be secured by Letters Patent is:

1. In a pneumatic tire for vehicles, a carcass, an annular tread applied over the crown portion of the carcass, means defining a radially inward recess extending continuously throughout the entire periphery of the tread at each side thereof forming a continuous annular freely hanging shoulder portion extending laterally from each side of the tire above such recess, a circumferentially spaced series of ribs disposed in the said recess perpendicularly to the freely hanging shoulder portion to yieldingly support the outer portions of the said shoulders and a cavity formed in each said rib, with such cavities being in alignment thereby forming an annular ventilation channel below the freely hanging shoulder portion.

2. The pneumatic tire as set forth in claim 1, wherein the said cavities are formed radially inward from the said shoulder portions.

3. In a pneumatic tire for vehicles, a carcass, an annular tread applied over the crown portion of the carcass, means defining a radially inward recess extending continuously throughout the entire periphery of the tread at each side thereof forming a continuous annular freely hanging shoulder portion extending laterally from each side of the tire above such recess, a circumferentially spaced series of ribs disposed in the said recess perpendicularly to the hanging shoulder portion to yieldingly support the outer portions of the said shoulders, the circumferential spacing of the said ribs being a multiple of the rib width, and a cavity formed in each said rib, with such cavities forming an annular ventilation channel below the freely hanging shoulder portion.

References Cited in the file of this patent

UNITED STATES PATENTS

| 2,143,528 | Thomas | Jan. 10, 1939 |
| 2,303,164 | Hawkinson | Nov. 24, 1942 |

FOREIGN PATENTS

| 205,055 | Switzerland | Aug. 16, 1939 |
| 367,736 | France | Nov. 8, 1906 |
| 912,847 | France | Aug. 21, 1946 |
| 527,995 | Great Britain | Oct. 21, 1940 |